US 7,063,257 B2

(12) United States Patent
Buttifant et al.

(10) Patent No.: US 7,063,257 B2
(45) Date of Patent: Jun. 20, 2006

(54) MAGNETIC THREAD READER

(75) Inventors: John Buttifant, West Sussex (GB);
John Alan Skinner, Hampshire (GB);
Peter Dilwyn Evans, Hampshire (GB);
Michael Potter, Hampshire (GB); Peter Alan Pullan, Hampshire (GB); Barry Clifford Scowen, Surrey (GB)

(73) Assignee: De la Rue International Limited, Hampshire (GB)

( * ) Notice: Subject to any disclaimer, the term of this patent is extended or adjusted under 35 U.S.C. 154(b) by 280 days.

(21) Appl. No.: 10/432,222

(22) PCT Filed: Jan. 7, 2002

(86) PCT No.: PCT/GB02/00039

§ 371 (c)(1),
(2), (4) Date: Jul. 22, 2003

(87) PCT Pub. No.: WO02/059841

PCT Pub. Date: Aug. 1, 2002

(65) Prior Publication Data

US 2004/0046023 A1    Mar. 11, 2004

(30) Foreign Application Priority Data

Jan. 8, 2001  (GB) ................... 0100451.4
Jun. 11, 2001  (GB) ................... 0114212.4

(51) Int. Cl.
*G06K 7/08*  (2006.01)

(52) U.S. Cl. .................................... 235/449

(58) Field of Classification Search ................ 235/449
See application file for complete search history.

(56) References Cited

U.S. PATENT DOCUMENTS 3,900,888 A * 8/1975 Uchikoshi et al. ............ 360/76
5,255,129 A   10/1993 Jones
5,378,885 A    1/1995 Jones, Jr. et al.
5,889,271 A    3/1999 Webb
6,053,406 A * 4/2000 Litman ....................... 235/449

FOREIGN PATENT DOCUMENTS

DE    199 21 653 A 1    9/2000
EP      1 050 855 A1   11/2000
GB      2 098 768 A    11/1982

* cited by examiner

*Primary Examiner*—Michael G. Lee
*Assistant Examiner*—Jamara A. Franklin
(74) *Attorney, Agent, or Firm*—Oliff & Berridge, PLC

(57) ABSTRACT

A method of detecting a magnetic thread comprises causing relative movement between the thread and an array of magnetic heads, each head generates a signal upon detecting a portion of the thread. The arrival of a thread at one of the heads is detected, that head being denoted a primary head, and the head on each side a secondary head. Output signals from the primary and secondary heads are monitored to generate a representation of the thread, and the magnitude of the signals from the primary and secondary heads are compared such that if the magnitude of the output signal from a secondary head exceeds that from the primary head, the primary and secondary heads are reallocated accordingly.

16 Claims, 10 Drawing Sheets

Calibration: Passed

Calibration: Failed

MAGNETIC THREAD READER

The present invention relates to a method and apparatus for detecting a security thread, for example for identifying a document from a security code carried by the thread.

It is well known that secure documents such as banknotes are provided with a security thread. This may be a simple metallic thread or comprise segments of magnetic material and segments of non-magnetic material.

It is possible to arrange the segments of magnetic and non-magnetic material such that they represent a code. Typically, the segments are arranged into fixed length elements so that they represent a binary word and this word may be repeated several times along the thread. For example, the fixed length elements may have a length of 2 mm, the presence of magnetic material indicating a binary 1 and the absence indicating a binary 0.

This code can be read using a magnetic head or an array of heads. This would typically be done by temporarily magnetising the magnetic material constituting a thread and arranging for the documents to be carried by a transport mechanism so that they pass by the array of magnetic heads, the magnetic material of the thread being in close proximity to the heads.

When the code has been read, it is possible to identify the document bearing the thread by comparing the code against a database of known codes.

GB 2098768B discloses a coded magnetic thread reader in which a linear array of magnetic heads scans a security thread embedded in a document and stores samples of the signals produced by the magnetic heads in storage devices which are sequentially scanned and compared against a fixed threshold in order to produce a binary bit stream corresponding to the variation of magnetisation along the thread.

Whilst GB 2098768B discloses an apparatus which allows a thread presented at an acute angle to the array of magnetic heads to be read, the method used is extremely wasteful of processing time since the signals produced by the heads are continuously sequentially scanned in order to produce the time varying output signal.

EP 0493438 describes apparatus for reading the code held in the thread whereby the signal produced by the magnetic head is digitised by comparing it against two thresholds. The level of these two thresholds may be increased in accordance with the amplitude of the signal excursion so that the sensing of the crossing of a threshold is substantially immune to variations in signal amplitude.

In accordance with a first aspect of the present invention, there is provided a method of detecting a magnetic thread comprising causing relative movement between the thread and an array of magnetic heads, each of which generates a signal upon detecting a portion of the thread; detecting the arrival of a thread at one of the heads and denoting that a primary head, and the head on each side a secondary head; thereafter monitoring output signals from the primary and secondary heads to generate a representation of the thread, and comparing the magnitude of the signals from the primary and secondary heads such that if the magnitude of the output signal from a secondary head exceeds that from the primary head, the primary and secondary heads are reallocated accordingly.

Hence, the invention provides a method which allows a thread that is presented at an acute angle to the linear array of magnetic heads to be correctly read. By monitoring the output signals from only those heads within the array that are in close proximity to the thread, the method uses minimal processing time.

Preferably, the magnetic thread is a coded magnetic thread. However, it is possible that the thread does not carry a code but is instead a continuous length of magnetic material.

Normally, the code held by the coded magnetic thread is reconstructed by combining the outputs from all heads that were either binary or secondary using a logical OR operation.

Typically, the peak values of the outputs from the primary and secondary heads will be used to determine if the output from a secondary head exceeds that from the primary head. However, an alternative method is to use the slew rate of the outputs from the primary and secondary heads to determine which is greater.

The magnetic thread may be in or on a sheet document and, in this case, the sheet document is typically a banknote. Alternatively, the method may be applied to a magnetic thread before it has been incorporated in a sheet document. If the array of magnetic heads is not linear then the signals generated by some of the magnetic heads may be time-shifted in order to align them with the signals generated by the remaining magnetic heads.

If the sheet document is a banknote the method may further comprise performing an analysis on the representation of the thread to determine the denomination of the banknote.

According to a second aspect of the present invention, there is provided an apparatus for detecting a magnetic thread comprising an array of magnetic heads each of which is connected to a respective processor which processes signals generated by the associated magnetic head; and a processing system connected to the processors, the processing system being adapted to carry out a method according to the first aspect of the present invention.

Normally, the apparatus further comprises a document transport system for moving a document relative to the array of magnetic heads, the document transport system being stopped if the processing system cannot identify the document from the representation of the thread. Alternatively, if the processing system cannot identify the document, the document may be diverted to a different location from the default.

The apparatus may also be constructed to perform a "value balancing" operation in which a stack of mixed denomination banknotes is evaluated and optionally sorted into different output stacks according to their denomination.

Preferably, the array of magnetic heads comprises at least one permanent magnet. However, it is also possible to use a separate permanent magnet to magnetise the magnetic material which constitutes the thread.

The arrival of part of the magnetic thread may be determined by continuously polling the signals produced by the processor associated with primary and secondary heads. Preferably, the processor generates an interrupt signal when the associated detector senses the arrival of part of the magnetic thread, the processing system maintaining an interrupt mask in accordance with the primary and secondary heads.

The array of magnetic heads may be a linear array. Alternatively the magnetic heads may be arranged so that they lie on any one of a plurality of parallel axes, each one offset from the others. In a typical arrangement, some of the magnetic heads lie on a first axis and the remainder lie on a second axis that is parallel to the first axis.

The array of magnetic heads may comprise either inductive or magnetoresistive magnetic heads or a combination of these.

Another disadvantage with prior art techniques involves reading codes which incorporate a succession of binary 1s. In this case, the continuous length of magnetic material will be long enough that the flux density becomes constant. Hence, any signal generated by the magnetic head and any associated high pass filtering will decay towards zero and will then rise again due to the change in flux density when the end of the magnetic element approaches the head. As such, it is possible for a long magnetic element to be incorrectly detected as two separate shorter magnetic elements with a length of non-magnetic material between them.

U.S. Pat. No. 5,889,271 describes a method of detecting a coded thread using multiple reading channels to detect each thread segment but is complex to implement.

In accordance with a third aspect of the present invention, there is provided a method of detecting a coded magnetic thread comprising sensing the response of a magnetic field detector as a thread passes the detector, the response varying from an initial magnitude in first and second senses to exhibit a first peak, and then in the first sense to exhibit a second peak; comparing the response with first and second thresholds; and indicating the passage of a code element of the thread when the response passes the second threshold and then the first threshold in a predetermined manner characterised in that the first threshold is adjusted in accordance with a first predetermined algorithm based on the magnitude of the first peak.

Accordingly, it is possible, using this method, to detect a long magnetic element correctly by locating the first and second thresholds appropriately.

If the magnetic element is short then after the response has exhibited the second peak and then varied in the first sense, it varies in the second sense to return to its initial magnitude; thereby exhibiting a third peak.

However, if the magnetic element is long then after the response has exhibited the second peak and then varied in the first sense, it varies in the second sense and then in the first sense to exhibit a third peak and then varies in the second sense to return to its initial magnitude; thereby exhibiting a fourth peak.

Typically, the first sense is in a negative direction and the second sense is in a positive direction. In this case, the magnitude of the first threshold is lower than the initial magnitude of the response and the magnitude of the second threshold is greater than the initial magnitude of the response.

However, the reverse is also possible, wherein the first sense is in a positive direction and the second sense in a negative direction. Correspondingly, the magnitude of the first threshold is greater than the initial magnitude of the response and the magnitude of the second threshold is lower than the initial amplitude of the response.

Preferably, the initial magnitude of the response is zero. However, the initial magnitude of the response may take any other positive or negative value.

The first predetermined algorithm may adjust the first threshold so that its magnitude is a proportion of the magnitude of the first peak. Alternatively, it may adjust the first threshold so that its magnitude is the average of a predetermined number of preceding first peaks. The first predetermined algorithm may also adjust the first threshold so that its magnitude is based on a measurement of the background noise.

It is possible to adjust the second predetermined threshold in accordance with a second predetermined algorithm based on the magnitude of the second peak.

In this case, the second predetermined algorithm may adjust the second threshold so that its magnitude is a proportion of the magnitude of the second peak. Alternatively, it may adjust the second threshold so that its magnitude is the average of a predetermined number of proceeding second peaks. The second predetermined algorithm may also adjust the second threshold so that its magnitude is based on a measurement of the background noise.

According to a fourth aspect of the present invention, an apparatus is provided for detecting a coded magnetic thread comprising a magnetic field detector, a processing system for monitoring the response of the detector as a thread passes the detector, the response varying upon an initial magnitude in first and second senses to exhibit a first peak, and then in the first sense to exhibit a second peak, wherein the processing system is configured to compare the response of the detector against a first threshold, measure the first peak of the response of the detector, and to adjust the first threshold in accordance with a predetermined algorithm based on the magnitude of the first peak.

Preferably, the magnetic field detector is a linear array of magnetic heads, each of which is connected to a respective processor. Typically, each of the magnetic head processors is connected to a processing system which is adapted to carry out a method according to the third aspect of the invention.

A third disadvantage of prior techniques is that in order to identify the document bearing the thread, it was necessary to use a technique that involves rotating the code read from the thread through each possible permutation and comparing each of these permutations against each entry in a database. Hence, a 16 bit code would have to be rotated and compared 16 times against each entry in a database.

In accordance with a fifth aspect of the present invention, there is provided a method of identifying a coded magnetic thread comprising generating a digital representation of the thread and comparing the digital representation with one or more known digital representations characterised in that the method further comprises scanning the digital representation to locate a predetermined code sequence; rotating the digital representation to locate the predetermined code sequence in a predetermined position corresponding to the position of the predetermined code sequence in a stored version of the or each known digital representation prior to carrying out the comparison step.

This method overcomes the limitation of the above mentioned "sliding correlator" technique. By aligning the digital representation into the same format in which the known digital representations are stored, only one comparison is required for each known digital representation.

Preferably, the digital representation is binary.

Normally, the code is asymmetric and in this case, the comparison is performed against reversed versions of the known digital representations, thereby determining the orientation of the coded magnetic thread.

If the lateral displacement of the thread is measured, then this measurement may be used to determine which face of a sheet document containing the thread is uppermost.

Alternatively, the relative displacement of the thread from a known magnetic feature may be measured and used to determine which face of a sheet document containing the thread and magnetic feature is uppermost.

Preferably, prior to performing a comparison, the digital representation is scanned for at least one feature which indicates the likelihood that the digital representation is valid.

Preferred examples of features which may be scanned for are:

a) that the least significant and most significant bits are set;
b) that the number of bit changes are within predefined limits;
c) that the number of bits set are within predefined limits;
d) that the predetermined code sequence is present and in the correct location;
e) that the code is asymmetric.

Normally, different scores are applied to different features depending on their relative importance.

According to a sixth aspect of the present invention, an apparatus is provided for identifying a coded magnetic thread comprising a magnetic field detector, a processing system for processing signals generated by the detector to generate a digital representation of the thread and for comparing the digital representation with one or more known digital representations characterised in that the processing system is further adapted to scan the digital representation to locate a predetermined code sequence; and to rotate a digital representation to locate the predetermined code sequence in a predetermined position corresponding to the position of the predetermined code sequence in a stored version of the or each known digital representation prior to comparing the digital representation with the known digital representations.

Preferably, the processing system is further adapted to compare the digital representation against reversed versions of the known digital representations, thereby determining the orientation of the coded magnetic thread in the case that the code is asymmetric.

The apparatus may further comprise a detector for measuring the lateral displacement of the thread for determining which face of a sheet document containing the thread is uppermost.

Normally, the processing system is further configured to scan the digital representation for features which indicate the likelihood of the digital representation being valid, prior to performing the comparison.

According to a seventh aspect of the present invention, an apparatus is provided according to the sixth aspect of the present invention for carrying out a method according to the fifth aspect of the invention.

An example of a coded magnetic thread reader and methods according to the invention will now be described with reference to the accompanying drawings, in which.

Figure 1:
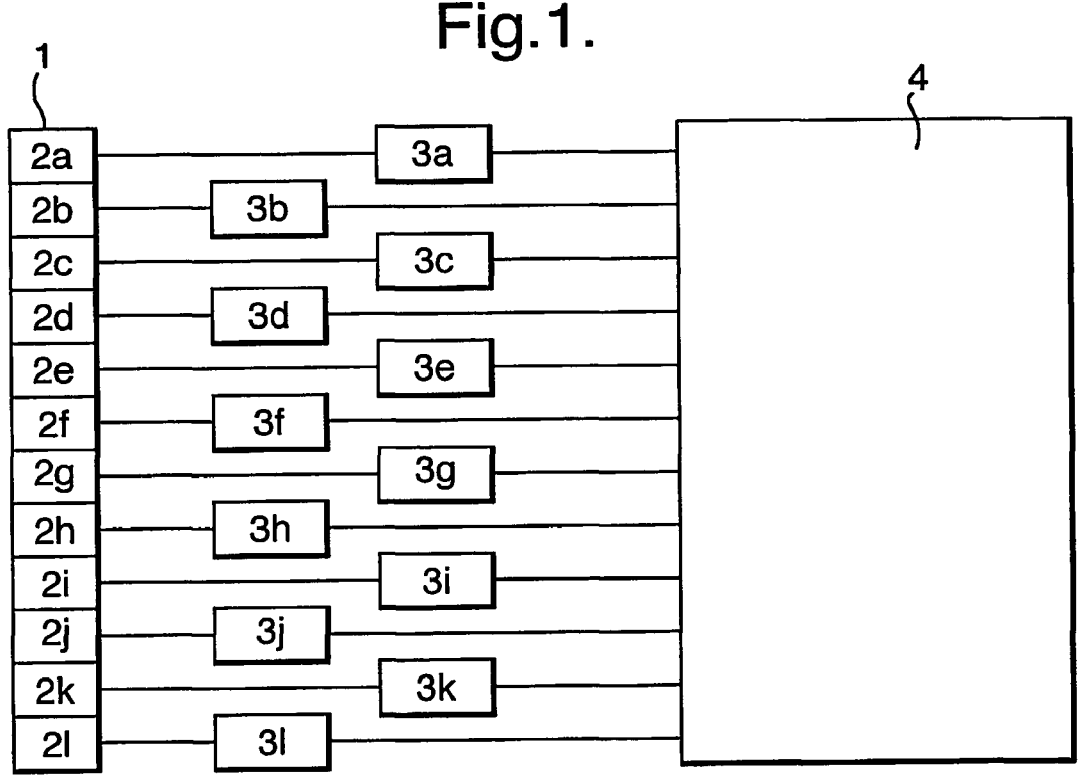
FIG. 1 is a schematic representation of a coded magnetic thread reader according to the invention.

A schematic representation of a coded magnetic thread reader suitable for reading the codes stored in a coded magnetic thread on a sheet document is shown in FIG. 1.

The reader comprises a linear array 1 of twelve magnetic heads 2a to 2l, each of which is connected to an individual signal processor 3a to 3l. The analogue signals generated by the magnetic heads are converted into a digital form by the signal processors 3a to 3l, which interface with a microprocessor system 4.

Software executed by the microprocessor system 4 performs further processing on the digitised signal in order to align the code into a known format and compare it against a database of known codes. The software also captures the peak positive and negative excursions of the analogue signal using the analogue to digital converters of the microprocessor system 4 and calculates appropriate thresholds from these. These thresholds are set on the signal processors 3a to 3l using digital to analogue converters of the microprocessor system 4.

Figure 2:
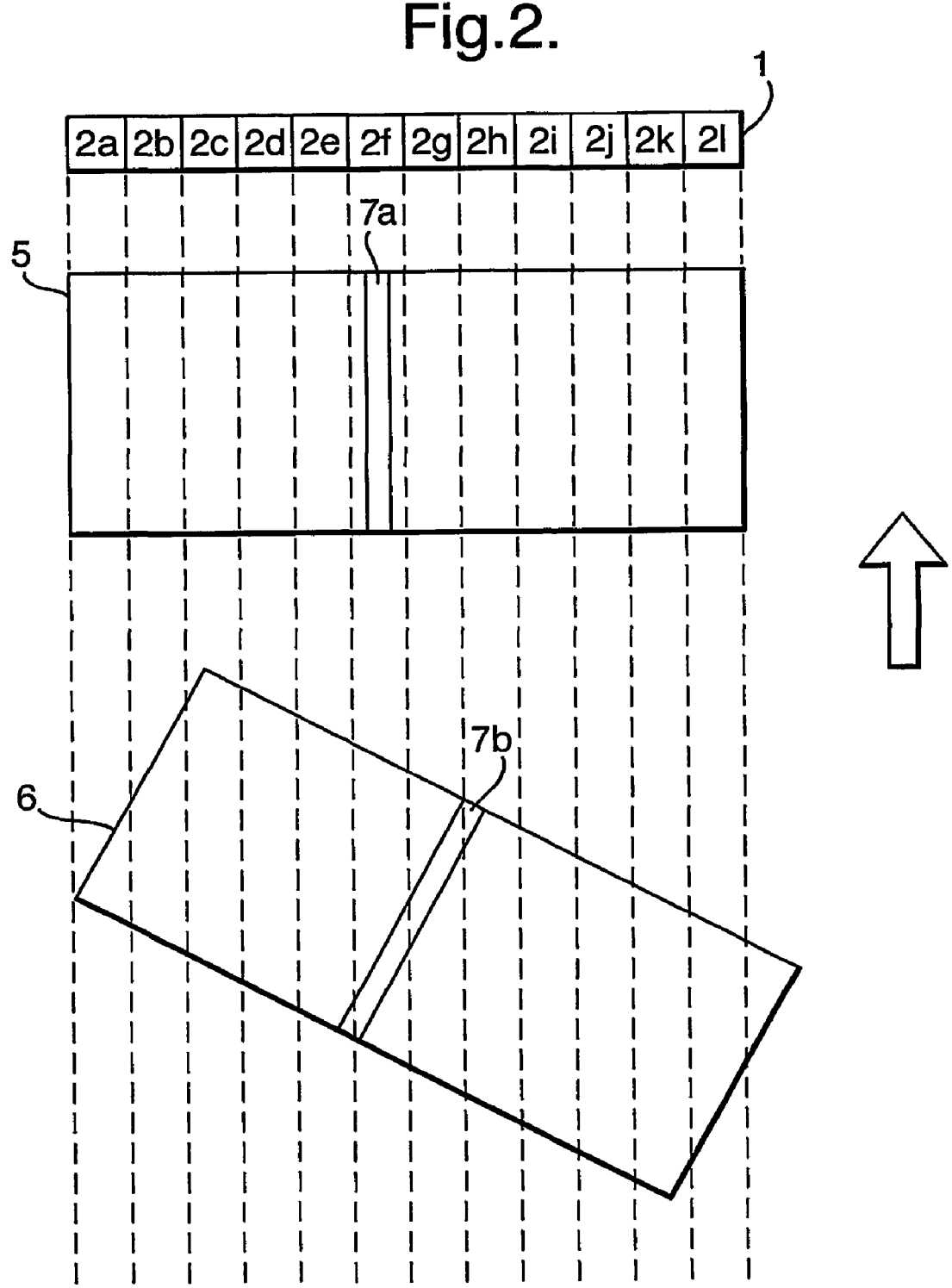
FIG. 2 shows two banknotes containing coded magnetic threads being transported past a linear array of magnetic heads, one of the banknotes being skewed.

FIG. 2 shows the linear array 1 of magnetic heads 2a–2l and two sheet documents 5,6 being conveyed by a document transport system (not shown) such that they will pass by the array 1 of magnetic heads 2a–2l. Each sheet 5,6 has a magnetic coded thread 7a,7b. As the sheets 5,6 approach the array 1 of magnetic heads 2a–2l, a permanent magnet, incorporated within the array 1, temporarily magnetises the magnetic material that constitutes the threads 7a,7b.

Figure 8:
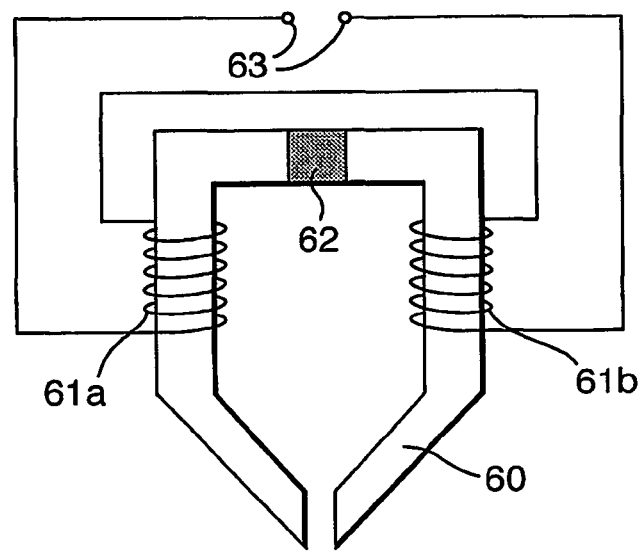
FIG. 8 shows an individual magnetic head incorporating a permanent magnet.

The arrangement of one of the magnetic heads is shown in FIG. 8. It comprises a core 60, which may be made from a ferrite, around the arms of which are wound two coils 61a, 61b. Permanent magnet 62 provides a magnetic bias at the air gap of the core which causes the magnetic material to be temporarily magnetised.

As the threads 7a,7b pass by the magnetic heads 2a–2l, an electromotive force is generated as the flux produced by the magnetic material couples with the coils 61a, 61b of the magnetic heads 2a–2l. Hence, a signal is generated at the terminals 63 of the magnetic heads according to the pattern of the magnetic material constituting threads 7a,7b.

Sheet 5 is being conveyed by the document transport system such that the thread 7a is presented perpendicularly to the linear array 1 of magnetic heads 2a–2l. It can be seen that the thread 7a will pass directly under magnetic head 2f and the code held by thread 7a can be reconstructed from the signal produced by magnetic head 2f alone.

However, sheet 6 is being conveyed such that thread 7b is skewed. Hence, although thread 7b will initially pass directly under magnetic head 2h, as it proceeds it will pass under magnetic head 2g, magnetic head 2f and eventually magnetic head 2e. To reconstruct the code it is necessary to combine the signals generated by all four magnetic heads 2e,2f,2g and 2h in an appropriate manner.

This is one reason why an array of magnetic heads is required. Another reason is that the lateral displacement of the thread may be different for different documents.

Figure 9:
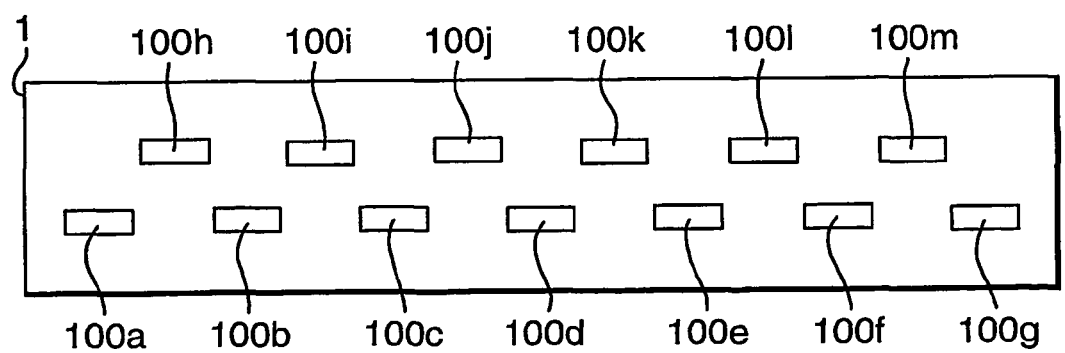
FIG. 9 shows an alternative array of magnetic heads.

An alternative arrangement for the array 1 of magnetic heads is shown in FIG. 9. In this arrangement the array 1 comprises thirteen magnetic heads 100a to 100m. However, these magnetic heads 100a to 100m are not configured in a linear fashion. Instead, they are configured on two parallel axes with magnetic heads 100a to 100g being on the first axis and magnetic heads 100h to 100m being on the second axis. Clearly, it would be feasible to arrange the magnetic heads 100a to 100m so that they were lying on three or more axes.

Before the signals developed by the magnetic heads 100a to 100m can be processed they must be time-shifted appropriately. Either the signals produced by the magnetic heads 100a to 100g lying on the first axis or the signals produced by the magnetic heads 100h to 100m lying on the second axis or both must be time-shifted so that they are in alignment. This can be done using analogue or digital processing techniques involving using the predetermined distance between the first and second axes and the velocity of a sheet document passing under the array 1 to determine the amount by which the signals produced by the magnetic heads lying on one axis must be time-shifted so that they are aligned with the signals produced by the magnetic heads lying on the other axis. The velocity of this sheet document can either be measured directly or the velocity of the document transport system can be determined.

The magnetic heads used in these examples are inductive heads but magnetoresistive heads could be used.

The signal processors 3a–3l and software incorporate features that enable detection of the thread irrespective of its lateral displacement and enable reconstruction of the code from the signal generated by several magnetic heads in the case of a skewed thread.

Figure 3:
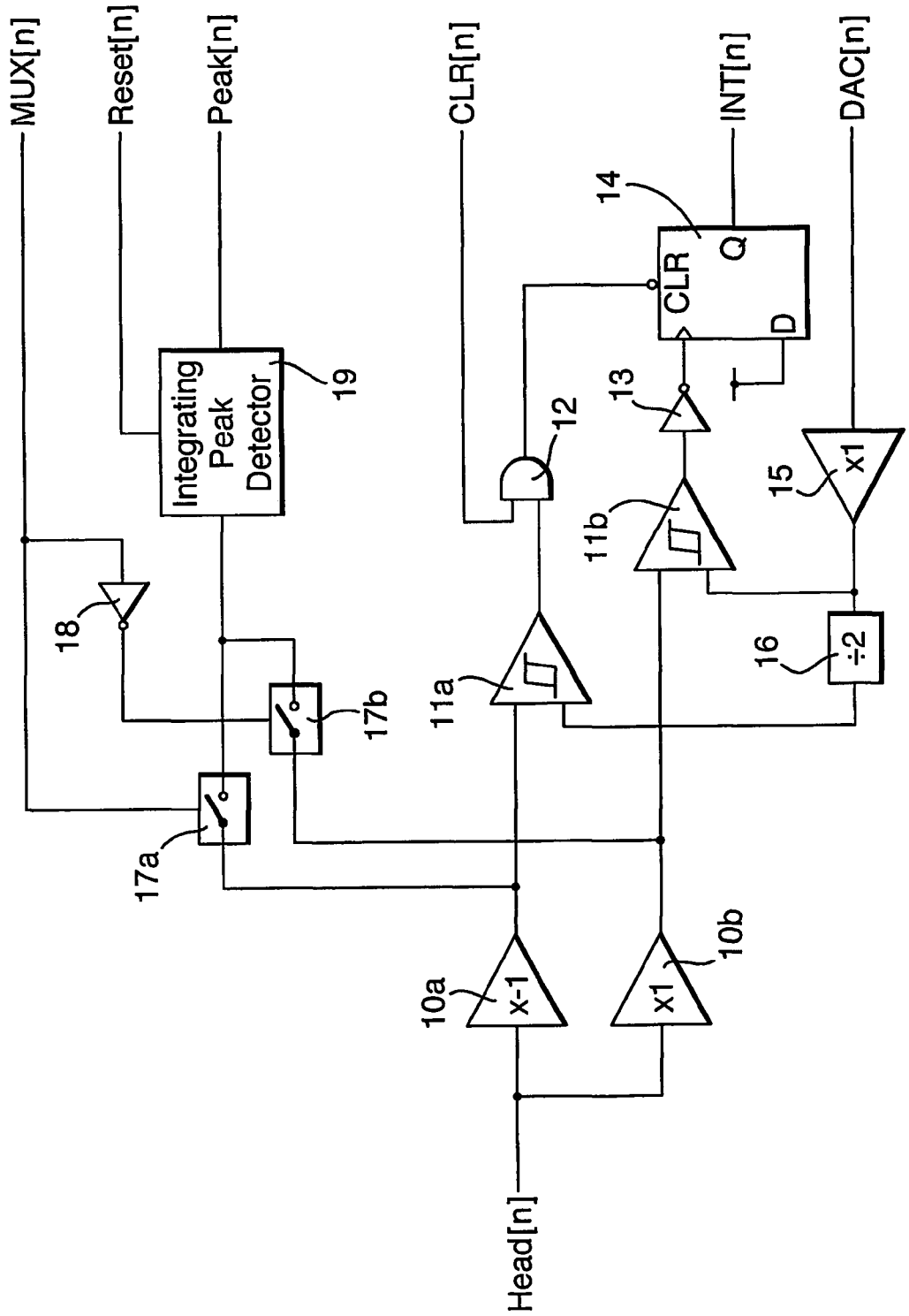
FIG. 3 shows a block diagram of a signal processor for processing signals from an array of magnetic heads.

One channel of the signal processors 3a to 3l will now be described with reference to FIG. 3. In the following description, n refers to the relevant channel number and takes an integer value from 0 to 11.

The analogue signal HEAD[n], generated by the magnetic head forms the input to a paraphase amplifier 10a,10b. The inverted and non-inverted outputs of the paraphase amplifier 10a,10b are connected to the inputs of a pair of comparators 11a,11b and to the inputs of a 2:1 multiplexer 17a,17b.

Comparators 11a and 11b compare the output signals from the paraphase amplifier with separate variable thresholds. If the inverted output from the paraphase amplifier 10a,10b exceeds the threshold input of comparator 11a then the output of comparator 11a is driven low which subsequently drives the output of AND gate 12 low and, since this output is connected to the clear input of D-type latch 14, the Q output of D-type latch 14 is also driven low. Similarly, if input CLR[n] from the microprocessor system 4 is driven low then the Q output of D-type latch 14 will be driven low in response.

If the non-inverted output of paraphase amplifier 10a,10b exceeds the threshold of comparator 11b then the output of comparator 11b is driven low. This output is inverted by inverter 13 and then connected to the clock input of D-type latch 14. Hence, since the D input of D-type latch 14 is permanently connected high, the Q output of D-type latch 14 will also be driven high.

The value of the thresholds of comparator 11a and 11b are determined by the microprocessor system 4 via output DAC[n]. This output is presented to a unity gain buffer 15 before being connected to the threshold input of comparator 11b. The output of unity gain buffer 15 is also connected to potential divider 16 which reduces the threshold presented to comparator 11a by a factor of two.

Both comparators 11a and 11b incorporate a degree of hysteresis to improve noise immunity and to prevent false switching.

The 2:1 multiplexer 17a,17b connects either the inverted or non-inverted output of the paraphase amplifier 10a,10b to the integrating peak detector 19. The logic state of signal MUX[n] determines which of these two outputs is connected to the integrating peak detector 19. Inverter 18 inverts the logic state of signal MUX[n] so that either analogue switch 17a or analogue switch 17b is closed.

Integrating peak detector 19 detects and stores the positive peak of the signal applied to it. This is presented to the microprocessor system 4 as signal PEAK[n]. The integrating peak detector 19 can be reset by asserting signal RESET[n].

Figure 4:
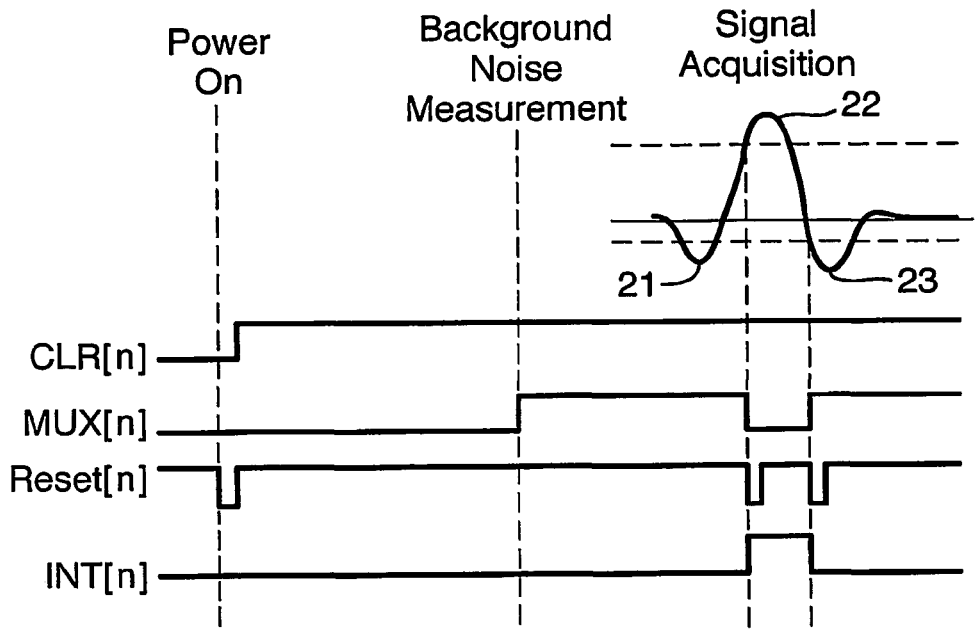
FIG. 4 shows the response generated by a magnetic head when a magnetic element passes thereunder and the corresponding signals produced by the signal processor.

A typical signal generated by one particular magnetic head similar to those described above, due to a 2 mm magnetic element passing by, is shown in FIG. 4. As the magnetic element approaches the head a negative peak 21 is generated. When the magnetic element is underneath the head, the direction of magnetic flux reverses and a positive peak 22 is generated. Finally, as the magnetic element moves away from the head, the flux reverses a second time and a second negative peak 23 is generated. This represents the signal HEAD[n] shown in FIG. 4.

The processing of this signal by one of the signal processors 3a to 3l will now be described with reference to FIG. 4. When the power is initially turned on, the microprocessor system 4 asserts signals CLR[n] and RESET[n] in order that the signal processing stages 3a to 3l are in a known state. The signal processors 3a to 3l then perform a background noise measurement using the integrating peak detector 19. The output signals from this, PEAK[n], are presented to the analogue to digital converters on the microprocessor system 4 and their values used to determine suitable thresholds for the comparators 11a and 11b. These are set by a digital to analogue converter which outputs a signal DAC[n] to the signal processing stages 3a to 3l. This signal is buffered by a unity gain inverter 15, the output of which determines a positive threshold. This output is also potentially divided, for example by a factor of 2, using a potential divider 16 which sets a negative threshold. For example, the positive threshold may be set at four times the peak noise level, the negative threshold consequently being half this magnitude. These thresholds may then be adapted and can be modified for each magnetic element scanned by the head. For example, the running average of the positive peak generated by a magnetic element could be calculated and used to determine a suitable positive threshold. The value of the thresholds can be stored in a non-volatile memory so that they are not lost when the apparatus is switched off.

The signal MUX[n] is now driven high and the signal processors 3a to 3l await the arrival of a valid signal generated by a magnetic element. As the magnetic element approaches a magnetic head, a negative going excursion is induced in signal HEAD[n]. This negative going excursion is inverted at the inverted output of paraphase amplifier 10a,10b and integrating peak detector 19 stores the peak value of this excursion. As the magnetic element passes underneath the head, the direction of magnetic flux reverses and a positive going signal excursion is induced. When the positive going excursion exceeds the value of the positive threshold, a clock pulse is supplied to the D-type latch 14 causing the Q output to be driven high. This generates an interrupt to the microprocessor system 4, the time of which is recorded. As a result of this interrupt, the value of the negative peak is recorded, the integrating peak detector 19 is reset and the signal MUX[N] is driven low so that the positive peak can be detected by the integrating peak detector 19. As the magnetic element moves away from the head, the direction of magnetic flux reverses a second time and a second negative going excursion is generated. The thresholds are now adjusted so that the negative threshold has a value derived from the immediately preceding negative peak. When the signal exceeds this threshold, the signal MUX[n] is driven high so that the integrating peak detector 19 is monitoring for the presence of a negative going peak and the clear input of the D-type latch 14 is asserted so that the interrupt to the microprocessor system 4 is cleared. The time of this event is recorded and hence the duration of the interrupt pulse can be determined. The length of the magnetic element can be derived from this duration using a clock that is driven by the transport system. After the time of the event is recorded, the value of the positive peak is recorded, the integrating peak detector 19 is reset and the signal MUX[n] driven high so that the next negative peak can be acquired. The value of the positive peak is used to determine when a skewed thread has passed from one magnetic head to an adjacent one as will be described subsequently.

Since the thresholds may be adjusted, the system can tolerate a wide variation in flux density of the magnetic material. Such variation may be caused by differing condition of the sheet documents bearing the threads, variance in the displacement between the magnetic heads and the threads or changing the speed of the document transport system.

Figure 5:
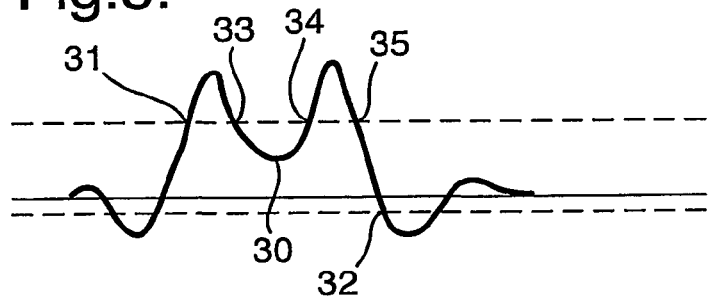
FIG. 5 shows the response generated by the magnetic head when an extended magnetic element passes thereunder.

A significant advantage of having separate positive and negative adaptive thresholds is that the system can correctly measure the length of longer magnetic elements. FIG. 5 shows a typical signal produced when a 6 mm length magnetic element passes by a magnetic head. The rate of change of the flux approaches zero when a long element such as this is directly beneath the head. Hence, the induced electromotive force also approaches zero. This can be seen as the dip 30 in FIG. 4. It can be seen that since there are positive and negative thresholds, the interrupt commences at point 31 and ends at point 32 as required. However, if only a positive threshold were used, then two interrupts would be generated, the first commencing at point 31 and ending at point 33 and the second commencing at point 34 and ending at point 35.

Figure 6:
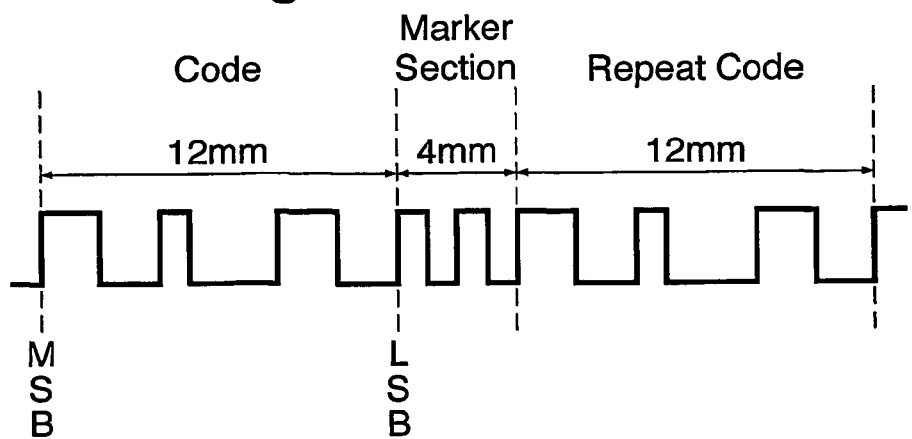
FIG. 6 shows an example of a possible code held by a coded magnetic thread after reconstruction by a signal processor.

In this way, as the magnetic coded thread passes underneath the head, the magnetic elements are reconstructed into a digital code. A possible example of such a code is shown in FIG. 6.

The software in the microprocessor system 4 is responsible for providing the appropriate outputs to the signal processors 3a to 3l at the correct time and responding to their inputs such that the data read from the magnetic code can be reconstructed. To do this, the software is split into two major sections. These are six synchronously executed processes and three interrupt service routines.

Figure 7:
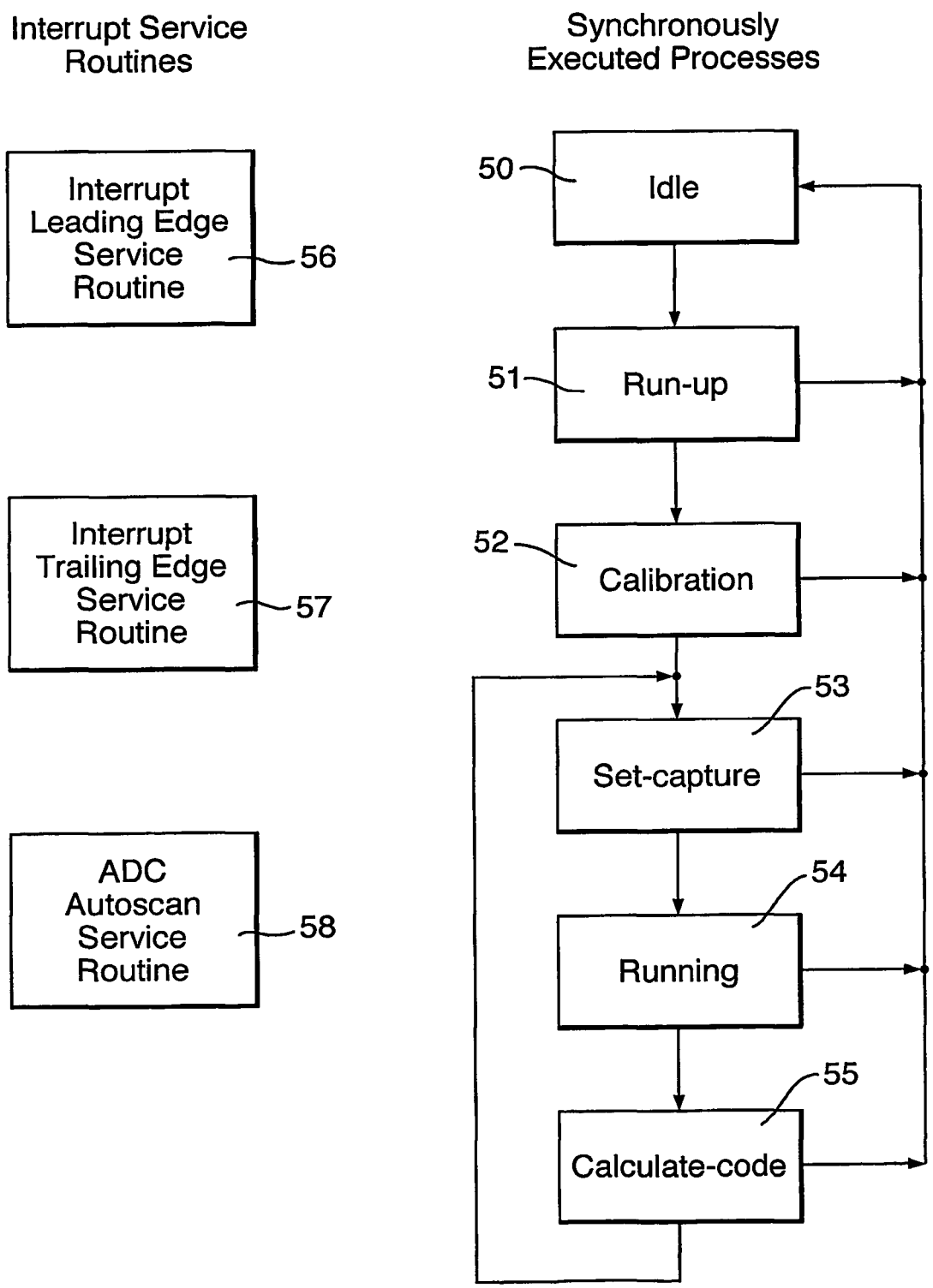
FIG. 7 shows a flow diagram of the software being executed by a microprocessor.

A software flow diagram is shown in FIG. 7. The operation of the individual software processes and interrupt service routines will now be described with reference to FIG. 7.

The microprocessor system 4 commences by executing process IDLE 50. This process is responsible for basic initialisation functions including checking whether any faults have been recorded by other software processes, reporting these faults if appropriate and checking whether any non-runtime communications have occurred. Execution now proceeds to process RUN-UP 51 on request, as long as there are no current faults.

Process RUN-UP 51 performs various other initialisation routines in order that background noise measurements can be performed to set the positive thresholds appropriately. Hence, all interrupts are disabled, the output MUX[n] is driven low so that the integrating peak detector 19 is recording positive peak values. Finally, the storage arrays for the head data are initialised by setting pointers to their beginning and if no faults have been logged, execution proceeds to process CALIBRATION 52.

This process is responsible for recording the peak background noise present on all heads. This is done by measuring the peak noise for 32 blocks of 1 millisecond each and averaging the peak detected for each of these blocks. The digital thresholds are now set with respect to the measured noise and if no faults have been logged, execution proceeds to process SET-CAPTURE 53.

The next three processes, SET-CAPTURE 53, RUNNING 54 and CALCULATE-CODE 55, together form the main execution loop during which data from the magnetic heads 2a–2l is captured. Process SET-CAPTURE 53 commences by asserting signal MUX[n] so that the integrating peak detector 19 is recording negative peak values. The code storage array is initialised and interrupts are enabled. If no faults have been logged then execution proceeds to process RUNNING 54.

The remaining two processes RUNNING 54 and CALCULATE-CODE 55 collate the data read from the signal processors 3a to 3l, align it into a known format and compare it with a database of known codes. It is important to realise that the data from the signal processors 3a to 3l is actually captured by two interrupt service routines that are executed in response to interrupts generated by signal processors 3a to 3l. A particular advantage of using interrupts is that it is not necessary to scan the entire array 1 of magnetic heads 2a to 2l until a valid signal is detected. Hence, the microprocessor system 4 can perform other tasks when no valid signal is present. The interrupt service routines, will be described subsequently.

Process RUNNING 54 is responsible for constructing a bit sequence from the data supplied by the interrupt service routines and for reconstructing the code if the thread is skewed. This process also monitors the bit sequence for the presence of a marker section and when sufficient bits have been captured and no errors have been logged execution proceeds to process CALCULATE-CODE 55. An example of a marker section of a possible code is shown in FIG. 6, the marker section in this case being a reversal pattern 1010.

If the thread is skewed, the code is reconstructed as follows:

a) Before the thread is in close proximity to the array 1 of magnetic heads 2a to 2l, all interrupts are enabled.

b) When the thread induces a signal in one of the magnetic heads 2a to 2l, the corresponding signal processor causes an interrupt.

c) This magnetic head is designated the primary head and the two immediately adjacent heads designated secondary heads. The interrupt mask is modified so that only interrupts from these three heads are enabled.

d) The positive peak values of the induced signals are used to determine when the thread has moved from the primary head to a secondary head. For example, as the thread traverses the array 1 of magnetic heads 2a to 2l, it will begin to induce signals in both the primary and one of the secondary heads. Eventually, the signal induced in the secondary head will exceed that induced in the primary head.

e) At this point, the relevant secondary head is designated the primary head and the two immediately adjacent magnetic heads designated secondary heads. The process continues in this manner.

Hence, the software can reconstruct the code simply by logically ORing the data captured by all heads that were primary or secondary as the thread passed the array 1 of magnetic heads 2a to 2l. An advantage of this is that it is only necessary to store pertinent information; the signals generated by magnetic heads that were not primary or secondary can be ignored and discarded.

Process CALCULATE-CODE 55 begins by finding the start and end of the captured code. It works from the centre of the captured code outwards since this is less likely to be corrupted by other magnetic features that may be present and tears in the edge of the sheet. When the start and end of the code have been located, the process searches for a repetition of this code which is used as a confidence check that the code is correct. The code is then aligned to a known format and compared against a database of known codes to find the best match. If a match is found then a flag is set to indicate this fact to the relevant software process. Execution then returns to process SET-CAPTURE 53 so that the next code can be captured.

The code is aligned by storing it in a circular buffer and rotating it until the marker section is in a known position. This has the advantage that only one comparison is necessary against each database entry whereas a sliding correlation technique requires rotating a m-bit code through each of its m permutations and comparing each permutation against each database entry.

The aligned code is compared with the database entries by logically exclusively ORing it with each entry. The number of bits set in the aligned code is divided by the result of this exclusive OR operation. The smallest value indicates the best match.

Further to this comparison, several scoring techniques can be used to determine the likelihood of the captured code being in error. This can be done by searching for certain features of the code, for example:

1. Confirm that the most and least significant bits are set.

2. Confirm that the number of bit changes and number of bits set are within allowable limits.

3. Confirm that the marker section is present and in the correct location.

4. Confirm that the code is asymmetric.

Finally, if the code has been corrupted and it is not possible to use the above alignment and comparison techniques, then the software will attempt to match the captured data using a sliding correlation technique. The scoring methods are still used.

There are two interrupt service routines responsible for recording the code held by the magnetic thread. The first of these, INTERRUPT LEADING EDGE SERVICE ROUTINE 56, responds to the leading edge of the interrupt generated by the D-type latch 14 of signal processors 3a to 3l whilst the second, INTERRUPT TRAILING EDGE SERVICE ROUTINE 57, responds to the trailing edge.

When the leading edge of an interrupt is detected, INTERRUPT LEADING EDGE SERVICE ROUTINE 56 is executed. This routine records the value of the negative peak and this value is used to set the negative threshold for the subsequent negative peak. The event is also time stamped and converted into displacement of the transport system using a clock that is synchronous with the transport system drive mechanism. The peak detector 19 is then reset and signal MUX[n] negated so that the multiplexer 17a, 17b presents positive signals to the integrating peak detector 19.

When the trailing edge of an interrupt is detected, INTERRUPT TRAILING EDGE SERVICE ROUTINE 57 is executed. This routine records the positive peak value from the integrating peak detector 19. This value is used to track the thread if it is skewed and moves from one magnetic head to another. The event is time stamped in a similar manner to the leading edge so that the length of the magnetic element can be determined. The peak value stored in the integrating peak detector 19 is cleared and the multiplexer 17a,17b is set to look for negative peaks. The pointer to the storage array is advanced to the next bit.

A third interrupt service routine, ADC AUTOSCAN SERVICE ROUTINE 58, is responsible for performing regular conversions of the twelve signals PEAK[n] from the signal processors 3a–3l using the analogue to digital converters of the microprocessor system 4. These conversions are triggered automatically by a timer interrupt. This is done to reduce the processor overhead. The converted values are only permanently stored if required such as on detection of the leading or trailing edge of an interrupt.

Once the captured code has been successfully compared with a database entry, it may be possible to determine certain information about the sheet document. For example, if the sheet document is a bank note, it may be possible to determine its denomination. On the basis of this it would be possible to send the note to a desired destination for example to split a stack of notes into two denominations. Alternatively, it would be possible to stop the document transport if the thread's code is unreadable or say a rogue denomination note is discovered in a stack of notes of a single denomination.

If the code is asymmetric, it is possible to detect the orientation of the sheet. If it is possible to detect the location of a feature of the sheet that is offset from its centre then it is possible to detect which face of the sheet is uppermost. For example, using an optical detector it is possible to determine the lateral position of the thread and this can be used to determine which face of the sheet is uppermost. Alternatively, the position of a known magnetic feature relative to the thread may be determined and this can be used to determine which face of the sheet is uppermost.

Figure 10:
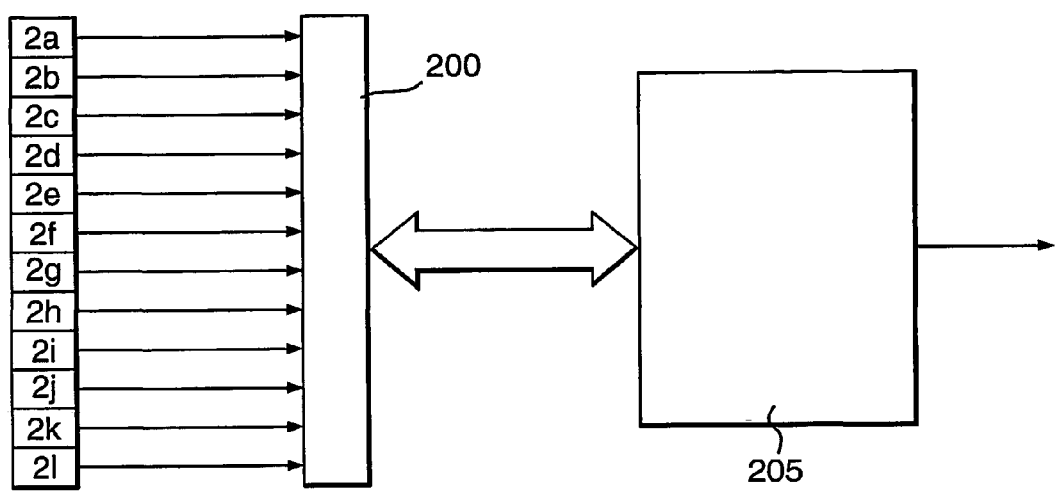
FIG. 10 is a block diagram of an alternative signal processor.

FIG. 10 illustrates a modified apparatus. In this case, the heads 2a–2l are connected to an analogue to digital converter (ADC) 200 which is connected to a digital signal processor (DSP) 205. The purpose of the DSP 205 is to process the digitised data and generate a series of digital waveforms representing the code stored within the magnetic feature. These waveforms are presented to the microprocessor 4 where pattern matching algorithms are applied to determine the authenticity and denomination of the note. The key advantages of this approach are;

Design flexibility—DSP and microprocessor algorithms can be modified and refined without affecting other system components.

Shared processor load—by putting the data reduction tasks into the DSP to generate a relatively simple digital waveform means that the microprocessor has spare capacity for more sophisticated pattern matching algorithms which will improve machine performance.

Devices easy to interface—ADC, DSP and microprocessor support relatively simple communication protocols to enable data exchange.

In operation, under instruction from the DSP 205, for each head, the ADC 200 samples the analogue signal every 0.25 mm, generates a digital representation and transmits this to the DSP. Whilst the ADC 200 is busy converting the current sample, the DSP 205 is processing the previous sample obtained from an adjacent channel in a pipeline structure. This process repeats until all the note data has been acquired, thus processing is performed in real-time.

Sampling for a pair of channels is governed by a free running timer at a fixed period of 9.4 μs. In order to ensure that each scan corresponds to a pitch of 0.25 mm, the system requires a measurement of the linear note speed. This is provided by a timing wheel consisting of a slotted-opto sensor (not shown) in a conventional manner. This provides a pulse corresponding to 4.42 mm linear travel. By measuring the number of timer pulses that have occurred within a timing wheel slot, the system can determine a sampling delay that is introduced to ensure the required sampling pitch.

Note sampling and processing is enabled under instruction of the microprocessor 4 and a track sensor (not shown). The track sensor is a reflective optical sensor that provides an indication of the presence of a note under the detector. Once the microprocessor 4 has instructed the DSP 205 to process notes, the system will wait until the track sensor indicates a note has arrived then processing will begin.

The DSP 205 performs three main processing tasks;
Thresholding and initial peak detection.
Application of a priori knowledge of the desired signals to the pre-processed data.
Generation of digital waveform for microprocessor.

Thresholding and Initial Peak Detection

The algorithm used to generate a digital waveform for the microprocessor 4 comprises peak detection and a priori signal conditioning. Peak detection is used since the signals generated from the inductive magnetic heads are based on rate of change of magnetic material past the head. Therefore transitions occur at boundaries between magnetic and non-magnetic features. Example idealised waveforms for various sized magnetic features are shown in FIG. 11.

Figure 11:
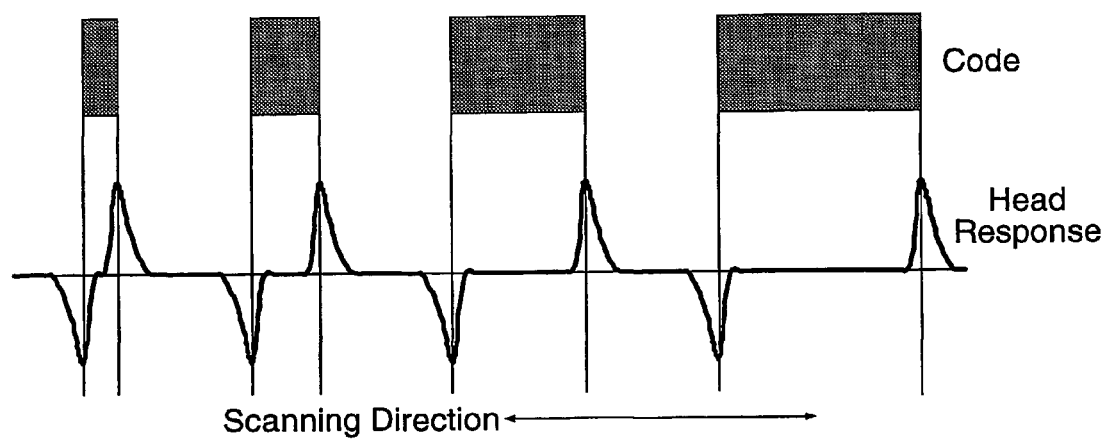
FIG. 11 illustrates an idealized waveform for different sized magnetic features in a coded thread.

From FIG. 11, it can be seen that peak detection could be used to determine the extent of the magnetic regions along a single plane. The problem with using a peak detector is that like any rate of change detector, it is susceptible to signal noise. In practice, noise will be present on the input signals and therefore mechanisms are required to reduce the effect of these artifacts. Two schemes may be used to provide a level of noise resistance; calibrated thresholds and larger peak detection window.

Calibration

Calibration is required so that the system can generate a suitable threshold for each channel. These thresholds will be used to stop processing of low amplitude signals which although they may satisfy the peak detector, are due to system noise rather than valid magnetic material passing across the head. The calibration scheme is as follows.

At machine run up to process a bundle of notes, once the transport motors are up to speed, the microprocessor 4 will instruct the DSP 205 to go into calibration mode. At this stage, the DSP 205 takes 32 samples and generates an average absolute level. A threshold being a constant multiple of the average level is created and stored. Finally, to check to see if any of the channels are particularly noisy or have a relatively wide spread of non-note signal levels, the DSP 205 examines the 32 samples to see if any exceed the calculated threshold. If so, calibration is reported as having failed otherwise calibration is a success and note processing can continue. The process is repeated for the remaining channels. If calibration has failed, the DSP 205 will report to the microprocessor 4 as being not ready and requires intervention.

The calibration process is performed on every bundle.

Figure 12A:
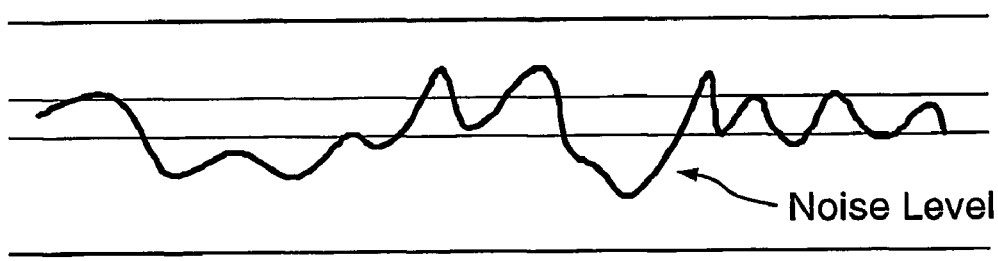
FIGS. 12A and 12B illustrate a successful and a failed calibration trace.
Figure 12B:
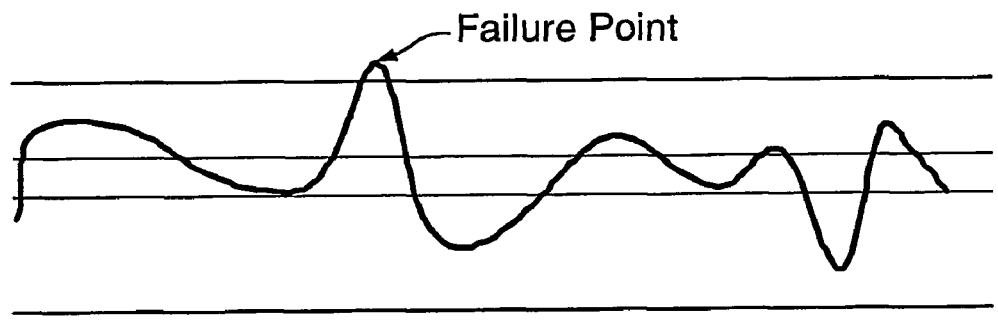

An illustration of two calibration examples is shown in FIGS. 12A and 12B.

Peak Detection Kernel

Figure 13:
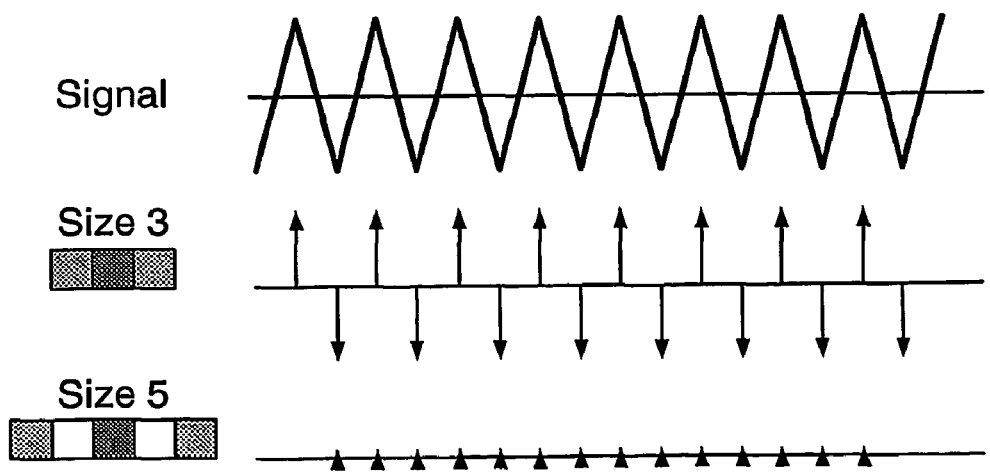
FIG. 13 illustrates the effect of changing kernel size.

The second scheme to provide a level of noise resistance is in the choice of peak detection kernel applied to the data. Rather than a rate of change kernel that looks at the differences between direct neighbouring values (size 3), the approach taken in this design is to look at the next nearest neighbour (size 5). A simple example that illustrates the benefit of a size 5 over a size 3 in terms of number of peaks detected is shown in FIG. 13.

A signal whose amplitude varies in a similar manner to the example above e.g. noise will produce a large number of peaks with a size 3 kernel whereas a substantially reduced number will be produced by the size 5 kernel. Since the peak transitions due to magnetic/non-magnetic boundaries take place over more than three samples, the size 5 kernel is sufficiently small enough to track these transitions whilst providing a level of noise immunity.

To construct a digital waveform suitable for processing by the microprocessor 4, the system applies the size 5 peak detector to data in real-time as it is acquired and adds valid peaks (i.e. a local minimum or maximum that is greater than the threshold band) to a list that contains information about peaks that have been found on a given channel. The data that is stored is the position along the note parallel to the short edge where the peak was detected, the type of peak detected (i.e. a positive or negative peak) and the location in DSP 205 memory where the raw analogue data from the ADC 200 for that peak is stored. The advantage of this is that the amount of data that has to subsequently be searched and processed is greatly reduced. This allows additional flexibility for more sophisticated algorithms since the volume of data has been reduced.

At this stage, the DSP 205 has produced (for all 12 channels) a set of events that contain all peaks that satisfy the thresholding criterion. The next process is to examine these peaks and determine which of those are valid and indicate true magnetic transition events and which are due to signal artifacts.

Figure 14:
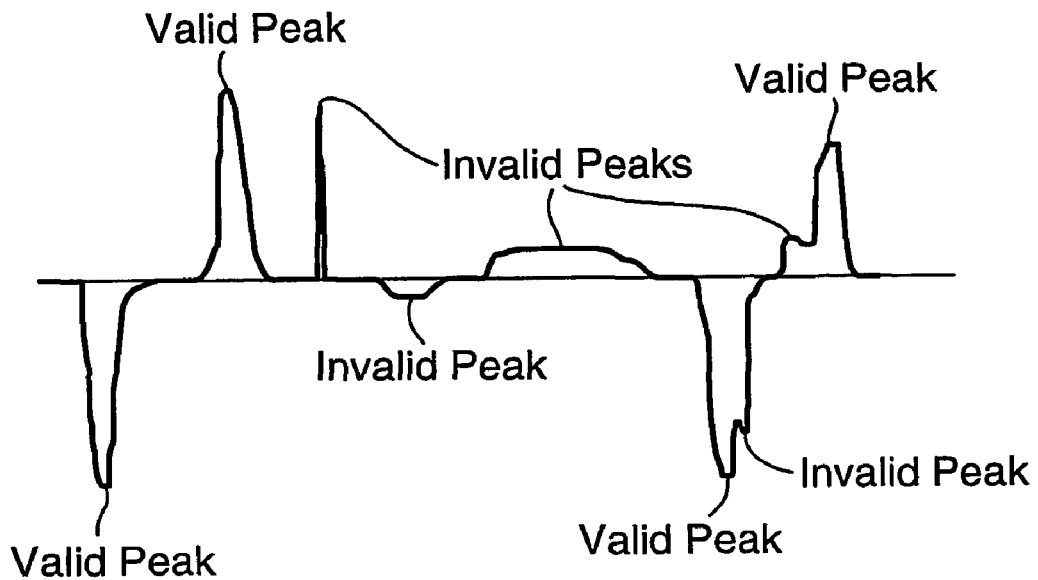
FIG. 14 illustrates different types of voltage peaks.

Application of a Priori Knowledge of the Desired Signals to the Pre-Processed Data Each of these voltage peaks is individually checked against more stringent criteria. These criteria encapsulate the key characteristics of valid magnetic transitions, including checks on the absolute levels of the induced voltages and checks on the signature of the voltage peak. Any voltage peak that fails the criteria check is disregarded. FIG. 14 illustrates this showing that each of the peaks that pass the initial assembly level routine check is classified as either valid or invalid.

Figure 15:
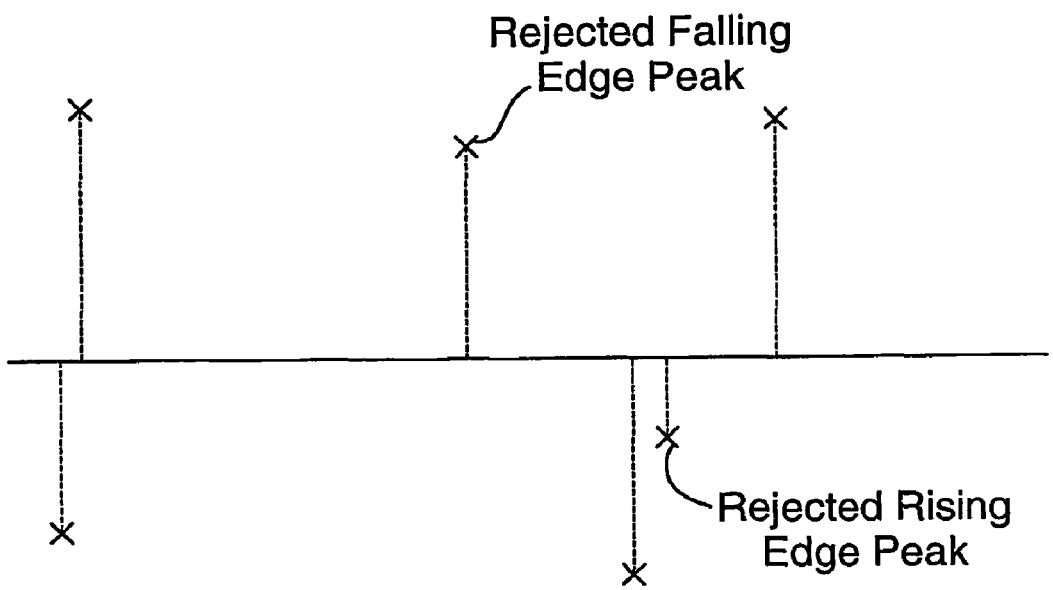
FIG. 15 illustrates different refined peaks.

This resultant subset of the initial voltage peaks is processed to further remove any erroneous signals. This is done in part by assessing the relative locations, magnitudes and shapes of each peak with those of any other peaks in close spatial proximity to it. This ensures that peaks that occur because of an increase in magnetic flux in the detector are matched with those peaks that correspond to a decrease in magnetic flux in the detector. Because of the complex note dynamics that occur as a note passes a detector, situations can arise in which there is ambiguity as to how the peaks should be joined together. For example, two voltage maxima may occur with no voltage minima between them. In this case, depending on the parameters associated with these peaks and any other peaks that are in close spatial proximity, either the first peak, the second peak or both peaks may be disregarded, or the likely position of the undetected minima is calculated. These decisions are made based on criteria ascertained from empirical and theoretical studies of the detected signals of valid notes fed through the machines. This processing stage produces a refined set of peaks for each channel where a high proportion of erroneous peaks are likely to have been filtered out. This process is illustrated in FIG. 15. The relative locations, magnitudes and signs of the peaks are shown schematically by the 'x' symbols. One peak has been rejected because a falling edge peak should have been preceded by a corresponding rising edge peak within a given distance (where the distance corresponds to the length including a tolerance of the longest magnetic region expected). The other peak has been rejected based on the peak properties because there are two rising edge peaks with only one falling edge peak.

This refined set of peaks is checked to make sure that a long magnetic region has not appeared to be made up of two shorter magnetic transitions. Again, this is done by evaluating the relative properties of a given group of peaks with those determined from empirical studies of the notes.

Generation of Digital Waveform

Figure 16:
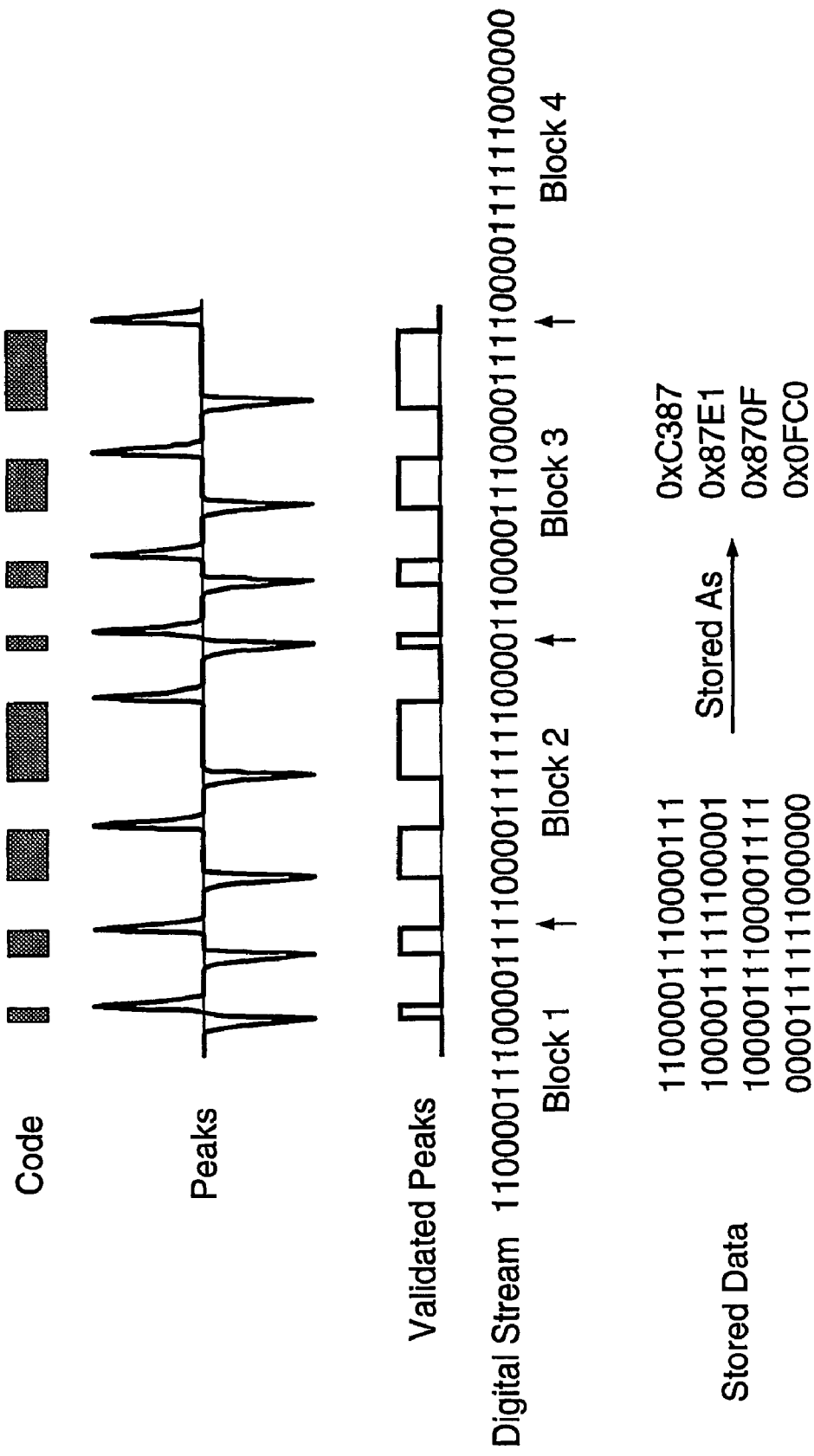
FIG. 16 illustrates a code, signals corresponding to the code and resultant stored data.

The data required by the microprocessor 4 is a digital bit stream stored in DSP memory for each channel. This stream is broken into chunks that can be stored in individual memory locations with 1 bit corresponding to a 0.25 mm sample. Therefore, for 16 bit storage, each location would correspond to 4 mm of note. As validated transition events are confirmed, the bit stream is constructed for each channel. Once an individual location has had all bits written to, the DSP moves on to the next location. An example is shown in FIG. 16.

The invention claimed is:

1. A method of detecting a magnetic thread comprising causing relative movement between a thread and an array of magnetic heads, each of which generates a signal upon detecting a portion of the thread; detecting the arrival of a thread at one of the heads, denoting that head a primary head, and denoting each head on each side of the primary head a secondary head; thereafter monitoring output signals from the primary and secondary heads to generate a representation of the thread, and comparing the magnitude of the signals from the primary and secondary heads such that if the magnitude of the output signal from a secondary head exceeds that from the primary head, the primary and secondary heads are reallocated accordingly.

2. A method according to claim 1, wherein the magnetic thread is a coded magnetic thread.

3. A method according to claim 2, wherein the code held by the coded magnetic thread is reconstructed by combining the outputs from all heads that were either primary or secondary using a logical OR operation.

4. A method according to claim 1, wherein the peak values of the outputs from the primary and secondary heads are used to determine if the output from a secondary head exceeds that from the primary head.

5. A method according to claim 1, wherein the magnetic thread is on a sheet document.

6. A method according to claim 5, wherein the sheet document is a security document such as a bank note.

7. A method according to claim 6, further comprising determining the denomination of the bank note from the representation of the thread.

8. A method according to claim 1, wherein the signals generated by some of the magnetic heads are time-shifted in order to align the signals generated by some of the heads with the signals generated by the remaining magnetic heads.

9. Apparatus for detecting a magnetic thread comprising an array of magnetic heads each of which is connected to a respective processor which processes signals generated by the associated magnetic head; and a processing system connected to the processors, the processing system causing relative movement between a thread and an array of magnetic heads, each of which generates a signal upon detecting a portion of the thread; detecting the arrival of a thread at one of the heads, denoting that head a primary head, and denoting each head on each side of the primary head a secondary head; thereafter monitoring output signals from the primary and secondary heads to generate a representation of the thread, and comparing the magnitude of the signals from the primary and secondary heads such that if the magnitude of the output signal from a secondary head exceeds that from the primary head, the primary and secondary heads are reallocated accordingly.

10. Apparatus according to claim 9, wherein the apparatus further comprises a document transport system for moving a document relative to the array of magnetic heads, the document transport system being stopped if the processing system cannot identify the document from the representation of the thread.

11. Apparatus according to claim 9, wherein the array of magnetic heads comprises at least one permanent magnet.

12. Apparatus according to claim 9, wherein the processor generates an interrupt signal when the associated detector senses the arrival of part of the magnetic thread, the processing system maintaining an interrupt mask in accordance with the primary and secondary heads.

13. Apparatus according to claim 9, wherein the array of magnetic heads is a linear array.

14. Apparatus according to claim 9, wherein the magnetic heads are arranged such that some lie on a first axis and the remainder lie on a second axis that is parallel to the first axis.

15. Apparatus according to claim 9, wherein the array of magnetic heads comprises inductive magnetic heads.

16. Apparatus according to claim 9, wherein the array of magnetic heads comprises magnetoresistive magnetic heads.

* * * * *